(12) United States Patent
DeSanzo et al.

(10) Patent No.: US 8,620,552 B2
(45) Date of Patent: Dec. 31, 2013

(54) DATA COMMUNICATION SYSTEM AND METHOD FOR COMMUNICATING DATA IN A VEHICLE

(75) Inventors: David Joseph DeSanzo, Erie, PA (US); David Schroeck, Erie, PA (US); Todd Goodermuth, Melbourne, FL (US); Veni Mudiam, Erie, PA (US); Matthew Joseph, Erie, PA (US); Sethu David Madhavn, Erie, PA (US); Enrique David Torres, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/311,306

(22) Filed: Dec. 5, 2011

(65) Prior Publication Data

US 2012/0316743 A1    Dec. 13, 2012

Related U.S. Application Data

(60) Provisional application No. 61/496,353, filed on Jun. 13, 2011.

(51) Int. Cl.
G01G 1/00 (2006.01)

(52) U.S. Cl.
USPC ............................................. 701/70; 701/117

(58) Field of Classification Search
USPC .................................................. 701/70, 117
See application file for complete search history.

(56) References Cited

U.S. PATENT DOCUMENTS

| | | | |
|---|---|---|---|
| 5,956,250 A | 9/1999 | Gudat et al. | |
| 6,336,120 B1 | 1/2002 | Noddings et al. | |
| 6,928,344 B2 | 8/2005 | McWalter et al. | |
| 6,996,397 B2 | 2/2006 | Fraser et al. | |
| 7,219,067 B1 | 5/2007 | McMullen et al. | |
| 7,239,859 B2 | 7/2007 | Madhavan et al. | |
| 7,243,012 B2 | 7/2007 | Miyake et al. | |
| 7,269,482 B1 | 9/2007 | Shultz et al. | |
| 7,504,706 B2 | 3/2009 | Swaminathan et al. | |
| 7,577,634 B2 | 8/2009 | Ryan et al. | |
| 7,647,142 B2 | 1/2010 | Desanzo | |
| 7,705,775 B2 | 4/2010 | Madhavan et al. | |
| 7,782,814 B2 | 8/2010 | Fraser et al. | |
| 7,880,609 B2 | 2/2011 | Viegers et al. | |
| 7,904,219 B1 | 3/2011 | Lowrey et al. | |

(Continued)

OTHER PUBLICATIONS

Search Report and Written Opinion from corresponding PCT Application No. PCT/US2012/041987 dated Nov. 29, 2012.

*Primary Examiner* — Mary Cheung
*Assistant Examiner* — Yuen Wong
(74) *Attorney, Agent, or Firm* — GE Global Patent Operation; John A. Kramer

(57) ABSTRACT

A data communication system for a vehicle includes an interface gateway device that is configured to be communicatively coupled with a data acquisition module and a client module. The interface gateway device is further configured to receive a value of a data parameter related to operation of the vehicle from the data acquisition module and to communicate the value to the client module for performing a function for the vehicle. The interface gateway device also is configured to determine when either of the data acquisition module or the client module is communicatively coupled with the interface gateway device and to implement respective communication configurations associated with the data acquisition module or the client module to receive the value of the data parameter from the data acquisition module or communicate the value of the data parameter to the client module.

21 Claims, 3 Drawing Sheets

(56) References Cited

U.S. PATENT DOCUMENTS

| | | |
|---|---|---|
| 7,912,149 B2 | 3/2011 | Chesnutt et al. |
| 8,050,673 B2 | 11/2011 | Madhavan et al. |
| 8,054,924 B2 | 11/2011 | Madhavan |
| 2004/0142722 A1 | 7/2004 | Everett |
| 2005/0163727 A1 | 7/2005 | Doyle et al. |
| 2006/0193790 A1 | 8/2006 | Doyle et al. |
| 2007/0092024 A1 | 4/2007 | Madhavan et al. |
| 2007/0102811 A1 | 5/2007 | Swaminathan et al. |
| 2007/0120225 A1 | 5/2007 | Swaminathan et al. |
| 2007/0140987 A1 | 6/2007 | Doyle et al. |
| 2007/0190950 A1 | 8/2007 | Madhavan et al. |
| 2007/0258398 A1 | 11/2007 | Chesnutt et al. |
| 2007/0294033 A1 | 12/2007 | Osentoski et al. |
| 2008/0102854 A1 | 5/2008 | Yi et al. |
| 2008/0114530 A1* | 5/2008 | Petrisor et al. ............... 701/117 |
| 2008/0247484 A1 | 10/2008 | Chesnutt et al. |
| 2008/0255828 A1 | 10/2008 | Chesnutt et al. |
| 2009/0172102 A1 | 7/2009 | Chesnutt et al. |
| 2009/0234522 A1 | 9/2009 | Desanzo |
| 2009/0249074 A1 | 10/2009 | Madhavan et al. |
| 2009/0323967 A1 | 12/2009 | Peirce et al. |
| 2010/0131127 A1 | 5/2010 | DeSanzo |
| 2010/0167702 A1 | 7/2010 | Madhavan et al. |
| 2010/0167721 A1 | 7/2010 | Madhavan et al. |
| 2010/0167722 A1 | 7/2010 | Madhavan et al. |
| 2010/0167727 A1 | 7/2010 | Madhavan et al. |
| 2010/0167737 A1 | 7/2010 | Madhavan et al. |
| 2010/0167745 A1 | 7/2010 | Madhavan et al. |
| 2010/0185472 A1 | 7/2010 | Goodermuth et al. |
| 2010/0202616 A1 | 8/2010 | Peirce et al. |
| 2010/0241295 A1 | 9/2010 | Cooper et al. |
| 2010/0286853 A1 | 11/2010 | Goodermuth et al. |
| 2010/0302974 A1 | 12/2010 | Niiyama et al. |
| 2010/0321170 A1 | 12/2010 | Cooper et al. |
| 2011/0038307 A1 | 2/2011 | Madhavan et al. |
| 2011/0039527 A1 | 2/2011 | Yi et al. |
| 2011/0039528 A1 | 2/2011 | Yi et al. |
| 2011/0039533 A1 | 2/2011 | Yi et al. |
| 2011/0039538 A1 | 2/2011 | Madhavan et al. |
| 2011/0039556 A1 | 2/2011 | Yi et al. |
| 2011/0039587 A1 | 2/2011 | Madhavan et al. |
| 2011/0060486 A1 | 3/2011 | Meltser et al. |
| 2011/0068976 A1 | 3/2011 | Basnayake et al. |
| 2011/0093144 A1 | 4/2011 | Goodermuth et al. |
| 2011/0099413 A1 | 4/2011 | Cooper et al. |
| 2011/0103356 A1* | 5/2011 | Chandrasekaran ........... 370/338 |
| 2011/0144858 A1 | 6/2011 | Yun et al. |
| 2011/0144911 A1 | 6/2011 | Madhavan et al. |
| 2011/0217957 A1 | 9/2011 | Macdonald et al. |
| 2011/0249714 A1 | 10/2011 | Madhavan et al. |
| 2011/0282525 A1 | 11/2011 | Kraeling et al. |
| 2011/0284699 A1 | 11/2011 | Cooper et al. |
| 2011/0284700 A1 | 11/2011 | Brand et al. |
| 2011/0294466 A1 | 12/2011 | Tang et al. |

* cited by examiner

DATA COMMUNICATION SYSTEM AND METHOD FOR COMMUNICATING DATA IN A VEHICLE

CROSS-REFERENCE TO RELATED APPLICATIONS

This application claims the benefit of U.S. Provisional Application Ser. No. 61/496,353, filed Jun. 13, 2011, which is hereby incorporated by reference in its entirety.

BACKGROUND

Certain vehicles (e.g., powered vehicles or vehicle consists) include communication systems that periodically obtain measurements related to the health, operations, or control of the vehicle. For example, locomotives in a rail vehicle consist ("consist" referring to a group of vehicles linked to travel together along a route, including possible coordinated control by one or more wired and/or wireless connections) may include communication systems that periodically receive measurements related to operations of the locomotive, such as speed, horsepower, temperature, brake pressure measurements, and the like. These measurements represent data parameters of the vehicle, and the values of the data parameters may periodically change. For example, measurements of speed of a traction motor may be a first data parameter, measurements of brake pressures may be a second data parameter, and so on.

The values of the data parameters may be requested and used by computerized services or applications running on the vehicle and/or running off-board the vehicle. These services or applications perform various functions based on the data parameters. For example, the services or applications may control tractive operations and/or braking operations of the vehicle, monitor performance of the vehicle over time, record events of the vehicle, and the like. The systems that acquire the data parameters and that are native to the vehicle, such as the systems that are initially installed in the vehicle, may use a communication protocol to form and communicate data messages that include the values of the data parameters. Other services or applications may use a different communication protocol that uses a different format to communicate and/or use the data messages that include the data parameters.

The different protocols used to communicate with the various systems, services, and applications can require different communication configurations to be used. For example, in order for a single device to communicate with systems, services, and/or applications using different communication protocols, the single device may need to have different communication configurations stored thereon. The communication configurations can dictate the rules and criteria used for communicating with the systems, services, and/or applications according to the different protocols.

In some known vehicles, in order to allow for communication between a device and the systems, services, and/or applications that use different protocols to communicate, the various communication configurations must be previously stored on-board the device and the device must be manually configured to communicate with the systems, services, and/or applications. If one or more systems, services, or applications are changed or swapped out, the configuration of the device may need to be manually re-configured to allow for communication between the device and a new system, service, or application that uses a different protocol.

A need exists for a system and method that allows for different systems, services, applications, and the like in a vehicle and using different communication protocols to communicate with a device without requiring the manual re-configuration of the device each time a system, service, application, and the like, using a different communication protocol, is added to the vehicle.

BRIEF DESCRIPTION

In one embodiment, a data communication system for a vehicle includes an interface gateway device that is configured to be communicatively coupled with a data acquisition module and a client module. The interface gateway device is further configured to receive a value of a data parameter related to operation of the vehicle from the data acquisition module and to communicate the value to the client module for performing a function for the vehicle. The interface gateway device also is configured to determine when either of the data acquisition module or the client module is communicatively coupled with the interface gateway device and to implement respective communication configurations associated with the data acquisition module or the client module to receive the value of the data parameter from the data acquisition module or communicate the value of the data parameter to the client module.

In another embodiment, a data communication system for a vehicle is provided. The system includes an interface gateway device that is configured to be communicatively coupled with a data acquisition module and with a client module. The interface gateway device is further configured to receive a value of a data parameter related to operation of the vehicle from the data acquisition module and to communicate the value to the client module for performing a function for the vehicle. The interface gateway device also is configured, upon system initialization of the interface gateway device, to cycle through a plurality of communication protocols available to the interface gateway device, at each of a plurality of communication links of the interface gateway device, until the interface gateway device has determined that the data acquisition module and the client module are communicatively coupled with the interface gateway device and has identified first and second communication protocols of the plurality of communication protocols that enable the interface gateway device to communicate with the data acquisition module and the client module, respectively.

In another embodiment, a method for communicating data in a vehicle is provided. The method includes monitoring one or more input/output ports for a communication link with a device, determining an identity of the device that is communicatively coupled with the one or more input/output ports by the communication link, selecting a communication configuration associated with the device based on the identity of the device, and using the communication configuration to communicate with the device.

In another embodiment, a computer readable storage medium for a vehicle having a processor is provided. The computer readable storage medium includes one or more sets of instructions that direct the processor to monitor one or more input/output ports for a communication link with a device, determine an identity of the device that is communicatively coupled with the one or more input/output ports by the communication link, select a communication configuration associated with the device based on the identity of the device, and communicate with the device according to the communication configuration.

In another embodiment, a data communication system for a vehicle is provided. The system includes a data acquisition module, a client module, and an interface gateway module.

The data acquisition module is configured to obtain a value of a data parameter related to operation of the vehicle. The client module is configured to use the value of the data parameter to perform a function for the vehicle. The interface gateway device is configured to be communicatively coupled with at least one of the data acquisition module or the client module by one or more communication links. The interface gateway device is further configured to communicate the value from the data acquisition module to the client module. The interface gateway device also is configured to determine when the at least one of the data acquisition module or the client module is communicatively coupled with the interface gateway device and to implement a communication configuration associated with the at least one of the data acquisition module or the client module to communicate the value of the data parameter to the at least one of the data acquisition module or the client module.

DETAILED DESCRIPTION

Figure 1:
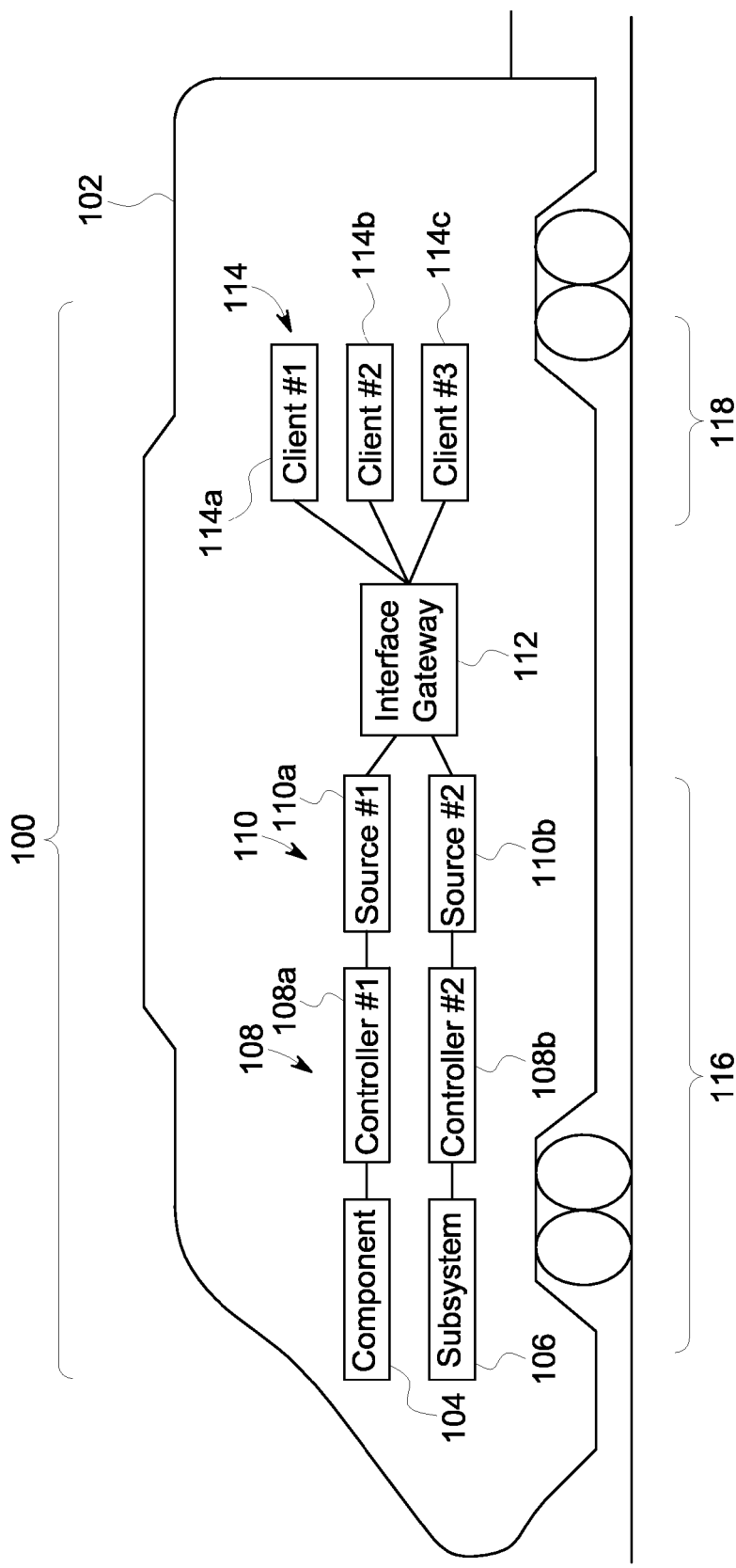
FIG. 1 is a schematic diagram of one embodiment of a vehicle data communication system disposed on-board a powered vehicle.

The foregoing brief description, as well as the following detailed description of certain embodiments of the inventive subject matter, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

FIG. 1 is a schematic diagram of one embodiment of a vehicle data communication system 100 disposed on-board a powered vehicle 102. In the illustrated embodiment, the vehicle 102 is illustrated as a rail vehicle, such as a locomotive. Alternatively, the vehicle 102 may be another type of rail vehicle (such as a non-powered cargo car) or a non-rail vehicle, such as a different type of off-highway vehicle (OHV) or other vehicle. The system 100 is shown in FIG. 1 as being disposed entirely on-board the single vehicle 102. Alternatively, the system 100 may be distributed among several interconnected vehicles, such as by being partially disposed on each of several vehicles that include the vehicle 102 and that are mechanically coupled in a consist or other group.

The system 100 manages the acquisition and distribution of data related to operations of the vehicle 102 among devices disposed on-board and/or off-board the vehicle 102. The vehicle 102 includes one or more components 104 and/or subsystems 106 that perform various operations of the vehicle 102. While only one component 104 and one subsystem 106 are shown in the illustrated embodiment, the system 100 may include a greater number or none of one or more of the component 104 and/or subsystem 106. By way of example, the components 104 and/or subsystems 106 of the vehicle 102 may represent a propulsion subsystem that generates tractive effort for the vehicle 102 to propel itself (e.g., a subsystem that includes one or more traction motors), a braking subsystem that generates braking effort for the vehicle 102 to slow down or stop itself from moving, a wireless communication system that is used to communicate with another vehicle or system outside of the vehicle 102 (e.g., a radio transceiver with antenna), a sensor that obtains data related to the vehicle 102 (e.g., a brake air pressure sensor, a fuel gauge, a cargo sensor, a global positioning system receiver, or the like), a device that receives input from an operator of the vehicle 102 to control the vehicle 102, and the like. The previous list provides a non-limiting example of the types of components 104 and/or subsystems 106 that may be used. In one embodiment, any device, sensor, system, subsystem, memory, module, assembly, processor, or the like may be used as the component 104 and/or subsystem 106. One or more of the components 104 and/or subsystems 106 may be disposed off-board the vehicle 102, such as by being disposed on-board another vehicle that is mechanically coupled or interconnected with the vehicle 102 (e.g., a mechanically linked other vehicle in a rail vehicle consist).

The component 104 and subsystem 106 are operably coupled with controller devices 108 (e.g., "Controller #1" and "Controller #2"). As used herein, the term "operably coupled" includes two or more controllers, devices, sensors, systems, subsystems, assemblies, processors, memories, modules, or the like that are connected by one or more wired and/or wireless communication links, such as cables, busses, other conductive pathways (e.g., copper wires), wireless networks, fiber optic cables, and the like, such as to enable communication of data therebetween. The controller devices 108 are generally referred to by the reference number 108 and individually referred to by the reference numbers 108a and 108b. While two controller devices 108 are shown, alternatively, a smaller or larger number of controller devices 108 may be provided.

The controller devices 108 interface with the components 104 and/or subsystems 106 to obtain values of one or more data parameters from the components 104 and/or subsystems 106. The controller devices 108 may include one or more electronic devices that obtain values of one or more of the data parameters from the components 104 and/or subsystems 106. In one embodiment, one or more of the controller devices 108 may direct operations of the components 104 and/or subsystems 106. The controller devices 108 can include sensors that obtain one or more of the data parameters from the components 104 and/or subsystems 106, processors or other logic-based devices, along with associated circuitry, that monitor and/or control the components 104 and/or subsystems 106, and the like.

The data parameters obtained by the controller devices 108 represent data values related to operations of the vehicle 102. As used herein, the term "operations" can refer to performance of the vehicle 102 (e.g., related to actions and events performed in propelling goods and/or passengers), control of the vehicle 102 (e.g., throttle and/or brake settings), and/or health conditions of the vehicle 102 (e.g., a status of the vehicle 102 such as whether maintenance is required for the vehicle 102 or one or more components 104 and/or subsystems 106 are malfunctioning).

For example, if the subsystem 106 includes a propulsion subsystem that includes one or more traction motors and/or a sensor operably coupled with the propulsion subsystem, the controller device 108b may obtain measurements of horsepower generated by the traction motors, measurements of wheel slippage of the wheels connected to the traction motors, temperatures measurements of bearings, wheels, and/or axles interconnected with the traction motors, and the like. If the subsystem 106 includes a braking subsystem that includes air brakes and/or regenerative brakes, the controller device 108b may obtain measurements of air pressure in the air brakes and/or reservoirs connected to the air brakes, measurements of current obtained from the regenerative brakes, settings of the air brakes and/or regenerative brakes, and the like. If the component 104 includes an antenna that is used to communicate with another vehicle or system outside of the vehicle 102, then the controller device 108a can obtain data parameters representative of which communication channels are being used, quality of service (QoS) measurements of communication over the antenna, and the like. If the component 104 includes a sensor, then the controller device 108a can obtain data parameters representative of quantities measured or sensed by the sensor. The above provides a non-exclusive set of data parameters that can be obtained by the controller devices 108. One or more other types of data parameters that relate to operations of the vehicle 102 may be obtained.

The controller devices 108 are operably coupled with data acquisition modules 110 (e.g., "Source #1" and "Source #2"). As used herein, the term "module" includes a hardware and/or software system that operates to perform one or more functions. For example, a module may include a computer processor, controller, or other logic-based device that performs operations based on instructions stored on a tangible and non-transitory computer readable storage medium, such as a computer memory. Alternatively, a module may include a hard-wired device that performs operations based on hard-wired logic of the device. The modules shown in the attached figures may represent the hardware that operates based on software or hardwired instructions, the software that directs hardware to perform the operations, or a combination thereof.

The data acquisition modules 110 are generally referred to by the reference number 110 and individually referred to by the reference numbers 110a, 110b, and 110c. While two data acquisition modules 110 are shown, alternatively, a smaller or larger number of data acquisition modules 110 may be provided. The data acquisition modules 110 interface with the controller devices 108 to acquire the values of the data parameters obtained by the controller devices 108 from the components 104 and/or subsystems 106. While each of the data acquisition modules 110 is shown as only interfacing or communicating with a single controller device 108, alternatively, one or more of the data acquisition modules 110 may interface with a plurality of the controller devices 108.

In the system 100, the data acquisition modules 110 may be referred to as "sources" of the available data parameters as the data acquisition modules 110 acquire the data parameters from the controller devices 108 and produce the data parameters for consumption (e.g., use) by one or more other parts of the system 100, such as client modules 114 described below.

The data acquisition modules 110 are operably coupled with an interface gateway device 112 ("Interface Gateway") in the illustrated embodiment. The interface gateway device 112 manages and controls the distribution of the data parameters through the system 100, as described in more detail below. For example, the interface gateway device 112 may act as an information gateway between a back end portion 116 of the system 100 and a front end portion 118 of the system 100. The back end portion 116 of the system 100 can generate the data that is used by the front end portion 118 of the system 100 to perform one or more functions, as described below. For example, the back end portion 116 can obtain values of the data parameters that are communicated via the interface gateway device 112 to the client modules 114, which use the values to perform various functions.

The back end portion 116 acquires the values of the data parameters as data and conveys the data in electronic messages (e.g., signals) to the interface gateway device 112. The interface gateway device 112 can receive the data via the messages and communicate the data to the client modules 114.

The client modules 114 ("Client #1" "Client #2," and "Client #3") are operably coupled with the interface gateway device 112. The client modules 114 are generally referred to by the reference number 114 and individually referred to by the reference numbers 114a, 114b, 114c. While three client modules 114 are shown, alternatively, a smaller or larger number of client modules 114 may be provided. The client modules 114 perform functions based on, or by using, at least some of the data parameters. For example, the client modules 114 interface with the interface gateway device 112 to receive the values of the data parameters from the interface gateway device 112. The client modules 114 send requests for data parameters to the interface gateway device 112 and may wait for a response from the interface gateway device 112 that includes the values of the data parameters. The client modules 114 may include or alternatively may be referred to as subscriber modules, which are "listening" devices that obtains the values of the data parameters used by the module by joining an address or a group, such as by issuing a "join" request to the interface gateway device 112 that joins the module to a multicast IP address. The interface gateway device 112 may periodically multicast the values of the data parameters to the IP address and the modules that subscribe to the IP address can receive the values. As described above, the client modules 114 may receive the data representative of the values of the data parameters in a format that is different from the format used by the back end portion 116 due to the gateway interface device 112 converting the format of the data.

A variety of functions related to operations of the vehicle 102 may be performed by the client modules 114. By way of example, a client module 114 may provide a digital video recorder (e.g., a locomotive digital video recorder or LDVR provided by General Electric Company) that obtains video recordings based on the data parameters (e.g., the data parameters may indicate when and/or where to record video). As another example, a client module 114 may provide asset tracking services (e.g., asset tracking system or ATS provided by General Electric Company) that monitors locations of assets (e.g., non-powered units and/or cargo such as goods and/or passengers) being propelled or conveyed by the vehicle 102 based on the data parameters.

A client module 114 may provide control services that control operations of the vehicle 102 and/or one or more other vehicles coupled or interconnected with the vehicle 102. For example, a client module 114 may use the data parameters to control the tractive efforts (e.g., by controlling throttle settings) provided by a propulsion subsystem of the vehicle 102 and/or to control braking efforts (e.g., by controlling brake settings) provided by brakes of the vehicle 102. The client module 114 may be part of a positive train control (PTC) system or a distributed power (DP) system that controls the tractive efforts and/or braking efforts of the vehicle 102 and/or one or more other powered units and/or non-powered units of a consist 100 (shown in FIG. 1) based on the data parameters. Alternatively, one or more of the client modules 114 may provide an energy management application that controls tractive effort and/or braking effort of the vehicle 102 (and/or one or more other powered units or vehicles of a consist 100) based on the data parameters. For example, a client module 114 may control throttle settings and/or brake settings based on a variety of factors represented by the data parameters, such as the types (e.g., horsepower provided) of powered units in a consist 100, the weight of cargo carried by the consist 100, the grade and/or curvature of a track that the vehicle 102 travels along, a geographic location obtained by a GPS receiver, and the like, in order to reduce fuel consumption by the consist 100. One example of such an energy management application may be the Trip Optimizer™ system provided by General Electric Company.

Other examples of a function provided by the client modules 114 can include control of cab signaling of a rail vehicle, an event recorder that monitors and records events related to operation of the vehicle 102, a location recorder that determines a geographic location of the vehicle 102 based on GPS sensor data received by a GPS receiver as a data parameter, fuel monitoring, radio monitoring, a visual display of operations or conditions of one or more components 104 and/or subsystems 106 of the vehicle 102, and the like. The above examples are provided for illustration and are not intended to be limiting on all embodiments of the presently described subject matter.

In one embodiment, the interface gateway device 112 may use different communication configurations for communicating with different components 104, subsystems 106, and/or client modules 114. A communication configuration may specify the parameters and settings used to communicate data messages between two devices, such as between the interface gateway device 112 and one or more of the data acquisition modules 110 and/or client modules 114. For example, a communication configuration may specify a communication protocol to be used to communicate the data messages between the devices. A "communication protocol" includes a set of one or more formats and/or rules for exchanging messages between the devices. Different communication protocols may use different types of signaling mechanisms, authentication techniques, error detection mechanisms, message correction techniques, and the like. A communication protocol may define the format, semantics, and/or synchronization of messages between devices using the protocol. A format of a communication protocol can represent the syntax in which data is recorded, read, and/or communicated between the devices in messages. For example, the format of a communication protocol may be based on a syntax of the protocol, such as one or more rules that define how various combinations of symbols, alphanumeric text, binary bits (e.g., 0's and 1's), and the like, are combined and used to represent and communicate data between a transmitter and a recipient that are communicating using the protocol.

A communication configuration may specify a sequence of how messages are exchanged between devices. For example, a first communication configuration may involve a message "handshake" between the devices in order to communicate between the devices. A message handshake can include two-sided messaging, such as a first device sending a first message to a second device and the second device sending a second message, such as a response or confirmation of receipt of the first message, to the first device. A different, second communication configuration may not require a message handshake, and instead may permit or provide for one-sided messaging. One-sided messaging can include a first device sending a first message to a second device without a second message being sent back to the first device from the second device.

In one embodiment, a communication configuration can include a list or set of one or more data parameters that are to be communicated or published to a device. For example, one or more client modules 114 may be associated with a communication configuration that specifies a predetermined list or set of data parameters. The values of the data parameters in the list or set can be published or transmitted to the client modules 114 that use the communication configuration via the interface gateway device 112. Different communication configurations can include different lists or sets of data parameters that are to be published.

A communication configuration can include a list or set of one or more data parameters that are available for communication or publication to a device. For example, not all data parameters that are obtained by the controller devices 108 may be available to all client modules 114 due to reasons of incompatibility, security, and the like. The communication configuration for a client module 114 may specify a subset of the data parameters that are obtained by the controller devices 108. For example, if the controller devices 108 obtain a set of one hundred data parameters, the communication configuration for a client module 114 may only include a subset of ten of the data parameters. The set of data parameters that are obtained by the controller devices 108 may be referred to as the "available data parameters." The communication configuration can limit the publication or communication of data parameters to the client module 114 to the subset of the available data parameters defined by the communication configuration.

In one embodiment, a communication configuration may specify whether a log or record is to be kept of the activities of the interface gateway device 112 and/or the device communicating with the interface gateway device 112. For example, the communication configuration may list activities, such as the data parameters, communication errors, requests for data parameters, and the like, that are transmitted by a data acquisition module 110 or client module 114 to the interface gateway device 112 and/or transmitted from the interface gateway device 112 to a data acquisition module 110 or client module 114.

The communication configurations associated with different data acquisition modules 110, client modules 114, or other components or devices of the system 100 may be stored as configuration files on a computer readable storage medium, such as a hard disc, flash drive, RAM, ROM, CD, DVD, or other type of memory, that is accessible by the interface gateway device 112. As described below, the interface gateway device 112 can monitor which data acquisition modules 110, client modules 114, or other components or devices of the system 100 are communicatively coupled with the interface gateway device 112. By "communicatively coupled," it is meant that two devices, systems, subsystems, assemblies, modules, components, and the like, are joined by one or more wired or wireless communication links, such as by one or more conductive (e.g., copper) wires, cables, or buses; wireless networks; fiber optic cables, and the like. When the interface gateway device 112 determines that a data acquisition module 110, client module 114, or other component or device is so coupled with the interface gateway device 112, the interface gateway device 112 may automatically load the corresponding communication configuration into the interface gateway device 112. By "load," it is meant that the interface gateway device 112 obtains the communication settings of the communication configuration and uses the settings to communicate with the data acquisition module 110, client module 114, or other component or device.

Figure 2:
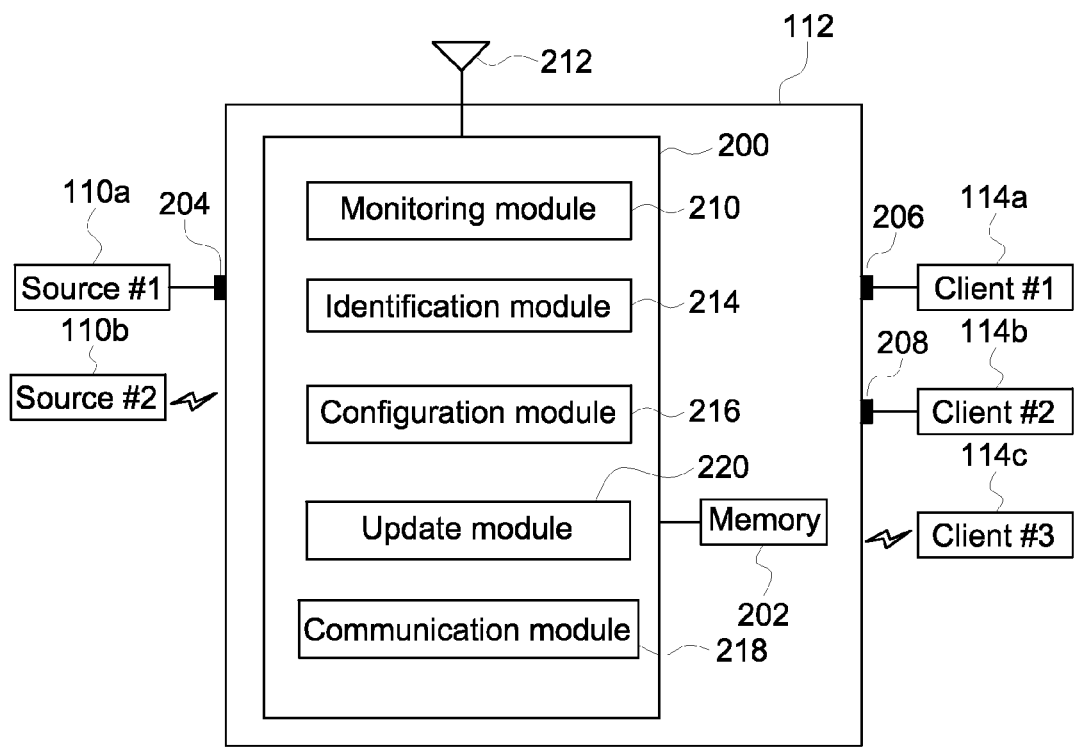
FIG. 2 is a schematic diagram of an interface gateway device shown in FIG. 1 in accordance with one embodiment.

FIG. 2 is a schematic diagram of the interface gateway device 112 in accordance with one embodiment. The interface gateway device 112 may include a hardware and/or software system that operates to perform one or more functions. In the illustrated embodiment, the interface gateway device 112 includes a processor 200 and a computer readable storage medium, or a memory 202, that perform various functions described herein. Alternatively, the interface gateway device 112 may include several modules that operate to cause the processor 200 to perform various functions described herein. For example, the interface gateway device 112 can be programmed or installed onto the memory 202 or into the processor 200 instead of including the processor 200 and/or memory 202. The processor 200 can include a microprocessor, controller, or equivalent control circuitry. The memory 202 can include a tangible and non-transitory computer readable storage medium, such as a physical device that stores data on a temporary or permanent basis for use by the processor 200. The memory 202 may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

The modules of the interface gateway device 112 include a monitoring module 210. The monitoring module 210 monitors one or more input/output ports of the interface gateway device 112 to determine when a device, such as a data acquisition module 110 or a client module 114, is communicatively coupled with the interface gateway device 112. For example, the data acquisition modules 110 and/or the client modules 114 may include electrical connectors 204, 206, 208 that mate with input/output ports 300, 302, 304 (shown in FIG. 3) of the interface gateway device 112 to communicatively couple the data acquisition modules 110 and the client modules 114 with the interface gateway device 112.

Figure 3:
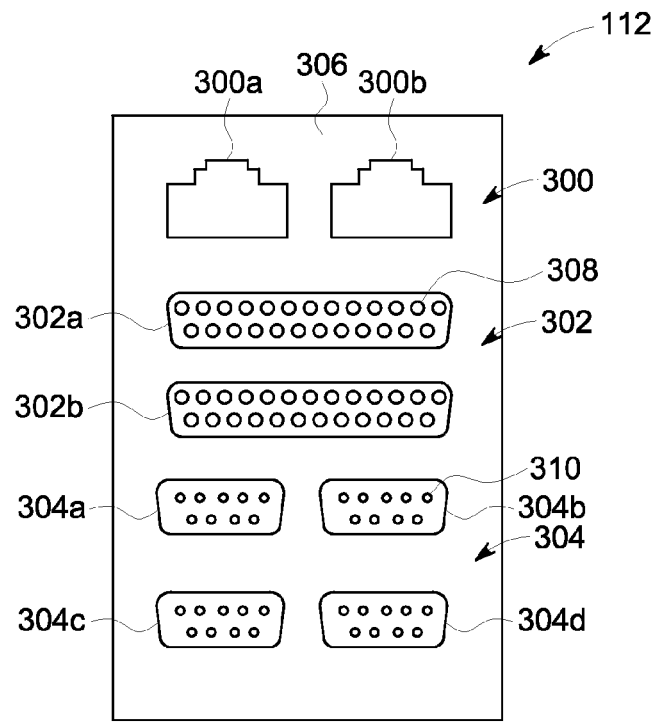
FIG. 3 is another schematic illustration of the interface gateway device shown in FIG. 1 in accordance with one embodiment.

With continued reference to FIG. 2, FIG. 3 is another schematic illustration of the interface gateway device 112 in accordance with one embodiment. The illustration of FIG. 3 may show a portion of an exterior housing 306 of the interface gateway device 112. The interface gateway device 112 includes the input/output ports 300, 302, 304 disposed on the housing 306. The ports 300, 302, 304 represent electrical connectors, such as electrical receptacles or plugs, that physically mate (e.g., receive or are inserted into) with the connectors 204, 206, 208 of the data acquisition modules 110 and the client modules 114 to communicate electronic messages therebetween.

In the illustrated embodiment, the ports 300 include Ethernet jacks 300a, 300b that are shaped to receive an Ethernet plug. For example, the ports 300 may receive one or more of the connectors 204, 206, 208 that is an Ethernet plug, such as an 8P8C plug, a 6P6C plug, a 6P4C plug, a 4P4C plug, and the like. Alternatively, one or more of the ports 300 may include an Ethernet plug and one or more of the connectors 204, 206, 208 may include an Ethernet jack. In another embodiment, connectors other than Ethernet jacks and plugs are used for the ports 300 and one or more of the connectors 204, 206, 208.

The ports 302 include serial receptacles 302a, 302b that are shaped to receive a serial connector plug in the illustrated embodiment. For example, the ports 302 may receive one or more of the connectors 204, 206, 208 that is serial plug, such as an RS 232 plug, an RS 422 plug, or the like. The ports 302 include conductive receptacles 308 that receive conductive pin of the serial plugs to conductively couple the ports 302 with one or more of the connectors 204, 206, 208. Alternatively, one or more of the ports 302 may include a serial plug and one or more of the connectors 204, 206, 208 may include a serial receptacle. In another embodiment, connectors other than serial receptacles and plugs are used for the ports 302 and one or more of the connectors 204, 206, 208. The ports 304 include serial plugs 304a, 304b, 304c, 304d that are shaped to be received in a serial receptacle. For example, the ports 304 may include an RS 232 plug, an RS 422 plug, or the like, having conductive pins 310 that are received in conductive receptacles (such as the conductive receptacles 308) in one or more of the connectors 204, 206, 208.

The number and/or type of input/output ports 300, 302, 304 shown in FIG. 3 are provided as examples. A greater or smaller number of the input/output ports 300, 302, and/or 304 may be provided. Additionally, one or more input/output ports other than the input/output ports 300, 302, and/or 304 may be included in the interface gateway device 112.

As shown in FIG. 2, in one embodiment, one or more of the input/output ports of the interface gateway device 112 that is used to communicate with one or more of the data acquisition modules 110 and/or the client modules 114 is a wireless communication channel. For example, instead of physically mating a connector with one or more of the input/output ports 300, 302, 304, one or more of the data acquisition modules 110 (such as the data acquisition module 110b) and/or the client modules 114 (such as the client module 114c) may communicate with the interface gateway device 112 through a wireless communication channel. A wireless communication channel may include one or more frequencies or range of frequencies over which the interface gateway device 112 may wirelessly communicate with the data acquisition device 110 and/or the client module 114. The interface gateway device 112 includes an antenna 212 that wirelessly communicates (e.g., transmits and/or receives) messages over one or more wireless communication channels with the data acquisition module 110 and/or the client module 114.

Returning to the discussion of the interface gateway device 112 shown in FIG. 2, the monitoring module 210 monitors one or more of the input/output ports of the interface gateway device 112 to determine when a device, such as a data acquisition module 110 or a client module 114, is communicatively coupled with the interface gateway device 112. With respect to the physical input/output ports 300, 302, 304 (e.g., the ports that include plugs inserted into receptacles, receptacles that receive plugs, fiber optic cables that are disposed close to or touching each other, or other connectors that mate with each other), the monitoring module 210 may determine when a conductive connection is made between conductors of a connector of a data acquisition module 110 or client module 114 and a connector of the interface gateway device 112. For example, the monitoring module 210 may determine when a conductive pin of a connector 204, 206, 208 is received in a conductive receptacle of an input/output port 300, 302, 304 in the interface gateway device 112, or when a conductive receptacle of the connector 204, 206, 208 receives a conductive pin of an input/output port 300, 302, 304. In one embodiment, the monitoring module 210 determines when a module is coupled with one or more input/output ports of the interface gateway device 112 by determining when an electric circuit is closed by the mating of a connector 204, 206, 208 and an input/output port 300, 302, 304.

With respect to wireless communication links, the monitoring module 210 can monitor one or more wireless communication channels to determine when a data acquisition module 110 and/or a client module 114 is communicatively coupled with the interface gateway device 112. For example, the monitoring module 210 may scan through a plurality of frequencies or wireless communication channels over the antenna 212 to determine which, if any, of the communication channels are being used to communicate data with the interface gateway device 112.

An identification module 214 determines which device is communicatively coupled with the interface gateway device 112. For example, once the monitoring module 210 determines that a data acquisition module 110 and/or a client module 114 is physically coupled or wirelessly coupled with an input/output port (physical port or wireless port/communication channel) of the interface gateway device 112, the identification module 214 may identify a type of data acquisition module 110 or client module 114 that is coupled with the interface gateway device 112. A "type" of data acquisition module 110 or client module 114 can include a category or group of data acquisition modules 110 or client modules 114 that use the same communication configurations described above. In one embodiment, a type of data acquisition module 110 or client module 114 can include a category or group of data acquisition modules 110 or client modules 114 that acquire one or more of the same data, communicate one or more of the same messages or use the same message formats, request one or more of the same data parameters, provide one or more of the same functions for the vehicle 102 (shown in FIG. 1), monitor one or more of the same operations of the vehicle 102, and the like.

In one embodiment, the identification module 214 may identify which data acquisition module 110 or client module 114 is communicatively coupled with an input/output port of the interface gateway device 112 by examining data communicated from the data acquisition module 110 or client module 114 to the interface gateway device 112 through the input/output port. For example, the data acquisition module 110 or client module 114 may transmit one or more messages that include identifying information to the interface gateway device 112 through the input/output port. The messages can include identifying information such as an address (e.g., IP address) or an alphanumeric bitstring that is unique to the data acquisition module 110, the client module 114, or a group or type of data acquisition modules 110 or client modules 114. For example, the messages communicated from the data acquisition module 110 or client module 114 may include header frames having identifying information of the module 110, 114 that transmitted the message.

In another embodiment, the input/output port 300, 302, 304 to which the data acquisition module 110 or client module 114 is mated and/or the connector 204, 206, 208 of the data acquisition module 110 or client module 114 may include keying features that permit a subset of the data acquisition modules 110 or client modules 114 to use the port 300, 302, 304. For example, and as shown in FIG. 3, the different ports 300, 302, 304 may have different shapes such that a subset of the connectors 204, 206, 208 are shaped to mate with the ports 300, 302, 304. The subset of the connectors 204, 206, 208 that can mate with the ports 300, 302, 304 may have complimentary shapes to the ports 300, 302, 304 while other connectors 204, 206, 208 do not have complimentary shapes. The complimentary shaped connectors 204, 206, 208 and ports 300, 302, 304 can mate with each other while non-complimentary shaped connectors 204, 206, 208 and ports 300, 302, 304 may not be able to mate with each other. In one embodiment, the keying features can include one or more protrusions, slots, receptacles, or other features that compliment each other such that some connectors 204, 206, 208 and ports 300, 302, 304 are able to mate with each other while other connectors 204, 206, 208 and ports 300, 302, 304 are unable to mate with each other. The identification module 214 can determine which data acquisition module 110 or client module 114 is mated which the port 300, 302, 304 when the data acquisition module 110 or client module 114 mates with the port 300, 302, 304. For example, if the keying features only permit one type of the data acquisition module 110 or client module 114 to mate with a particular port 300, 302, 304, then the identification module 214 can identify the data acquisition module 110 or client module 114 when the data acquisition module 110 or client module 114 mates with the port 300, 302, 304.

A configuration module 216 of the interface gateway device 112 determines the communication configurations for the data acquisition modules 110 and/or the client modules 114 that are communicatively coupled with the interface gateway device 112. In one embodiment, once the monitoring module 210 determines that the data acquisition module 110 or client module 114 is coupled with the interface gateway device 112 and the identification module 214 identifies which data acquisition module 110 or client module 114 is coupled with the interface gateway device 112, the configuration module 216 obtains the configuration settings for the corresponding data acquisition modules 110 and/or client modules 114. For example, the configuration module 216 may retrieve the settings for the communication configuration associated with the data acquisition modules 110 and client modules 114 from the memory 202.

As described above, the communication configuration associated with a data acquisition module 110 or client module 114 may specify the rules and/or procedures for communicating messages between the data acquisition module 110 or client module 114 and the interface gateway device 112. The configuration module 216 may load the communication configurations for the data acquisition module 110 or client module 114 by conveying the communication configuration settings to a communication module 218 described below.

An update module 220 can obtain the communication configurations for data acquisition modules 110 and/or client modules 114 that are not stored on the memory 202. For example, if the communication configuration for the data acquisition module 110 or client module 114 is not stored on the memory 202, the update module 220 may acquire the communication configuration for the data acquisition module 110 or client module 114. The update module 220 can acquire the communication configuration by querying an off-board device (e.g., a computer having a wireless transmitter or antenna) for the communication configuration. The off-board device may transmit the communication configuration to the update module 220 via the antenna 212. Alternatively, an on-board device (e.g., a computer device or other memory disposed on the vehicle 102 shown in FIG. 1) may provide the communication configuration to the update module 220. The update module 220 may store the communication configuration on the memory 202 and/or convey the communication configuration to the configuration module 216.

The communication module 218 receives the communication configuration from the memory 202, the configuration module 216, or the update module 216 and uses the communication configuration to control the communication of messages to and/or from the interface gateway device 112 with the data acquisition modules 110 and/or client modules 114 that are communicatively coupled with the interface gateway device 112. As described above, the communication configurations can specify the parameters and settings used by the communication module 218 to communicate data messages with the data acquisition modules 110 and/or client modules 114. The communication module 218 may concurrently use different communication configurations with different data acquisition modules 110 and/or client modules 114.

In another embodiment, upon application start (or commencement of operation of interface gateway device 112 (or similar device) starts all of its internal applications which correspond to every system and or subsystem with which the interface gateway device 112 is capable of communicating. For example, the interface gateway device 112 may begin internal algorithms, software applications, and the like, that permit or control communication between the interface gateway device 112 and every source 110 and/or client 114 with which the interface gateway device 112 is configured or is capable of communicating. The interface gateway device 112 attempts to establish communications via a handshaking process or other similar method using the input/output port 300, 302, 304. The interface gateway device 112 monitors the input/output port 300, 302, 304 in an order to determine if the correct response is received from the source 110 and/or client 114 connected to the input/output port 300, 302, 304. For example, during the handshaking process, the interface gateway device 112 may transmit one or more signals to a source 110 or client 114 through a corresponding input/output port 300, 302, 304. The source 110 or client 114 may then either respond with a designated confirmation response (e.g., confirming the handshake connection between the interface gateway device 112 and the source 110 or client 114), respond with a response that differs from the confirmation response (e.g., notifying that the handshake connection is not confirmed or established), or may not provide any response.

If the correct response (e.g., the designated confirmation response) is received from the source 110 or client 114, the interface gateway device 112 declares that communications with the source 110 or client 114 are established. The interface gateway device 112 adds that source 110 or client 114 to a list of connected devices that is maintained by the interface gateway device 112. If no response or an incorrect response is received (e.g., the confirmation response is not received or a different response is received), then the interface gateway device 112 may try to establish communication with another source 110 or client 114 on the same input/output port 300, 302, 304. The interface gateway device 112 may sequentially cycle through a list of sources 110 and/or clients 114 that may be connected to the input/output port 300, 302, 304 until the designated confirmation response is received or all sources 110 and/or clients 114 in the list have been attempted without receiving the designated confirmation response. Alternatively, the interface gateway device 112 may move on to the next input/output port 300, 302, 304 and repeat the process described above. Once the interface gateway device 112 establishes a list of all the connected sources 110 and/or clients 114 (or other devices), the interface gateway device 112 applies the appropriate internal configuration files. This permits the interface gateway device 112 to provide the functionality defined for that system and or subsystem.

Figure 4:
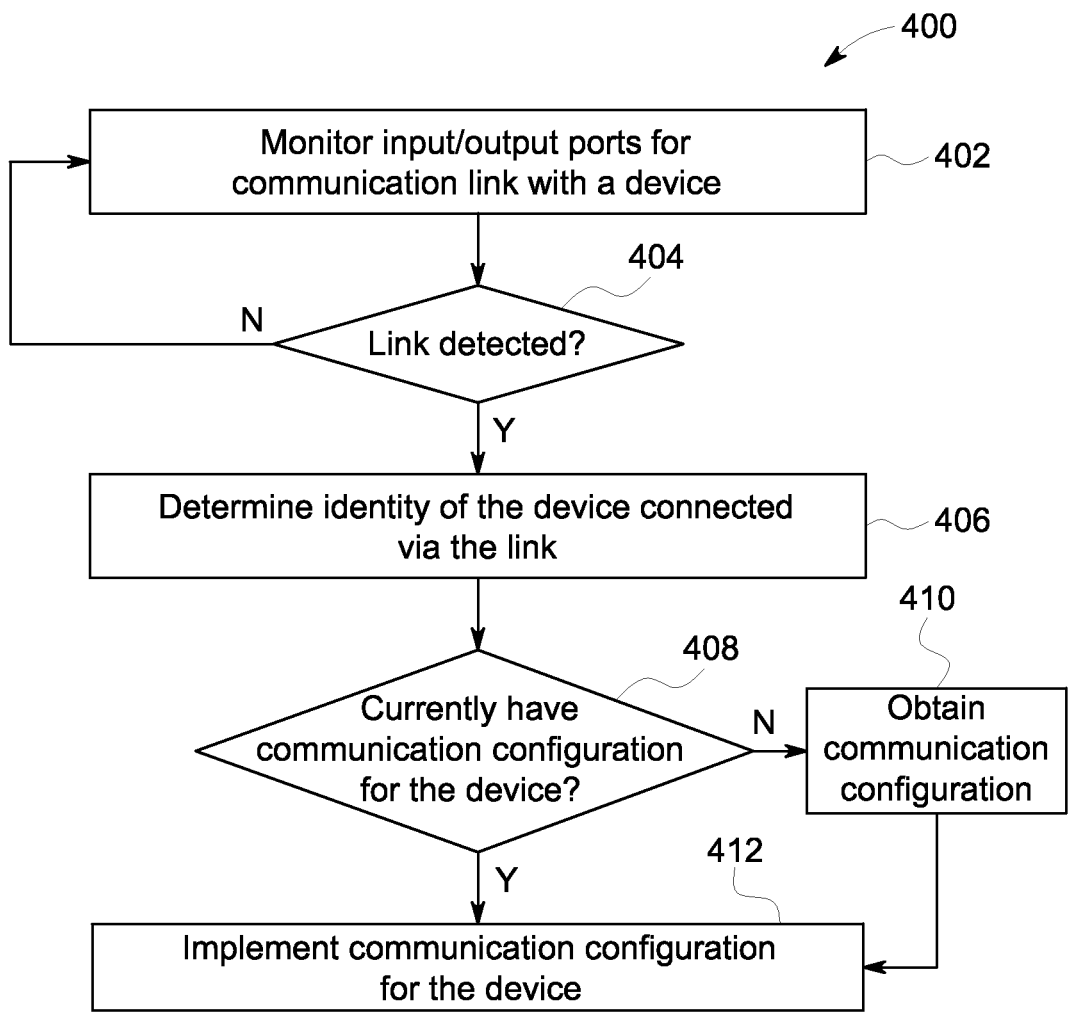
FIG. 4 is a flowchart of one embodiment of a method for communicating data in a vehicle.

FIG. 4 is a flowchart of one embodiment of a method 400 for communicating data in a vehicle. The method 400 may be used in conjunction with one or more embodiments of the system 100 (shown in FIG. 1) described above. For example, the method 400 may be used with a system in a vehicle that acquires values of data parameters and sends or publishes the values of the data parameters to one or more client modules to permit the client modules to perform one or more functions related to the vehicle.

At 402, one or more input/output ports are monitored to determine if a communication link is established. For example, the input/output ports 300, 302, 304 (shown in FIG. 3) and/or one or more wireless communication channels may be monitored to determine when a data acquisition module 110 (shown in FIG. 1) and/or a client module 114 (shown in FIG. 1) is physically mated to one or more of the ports 300, 302, 304 and/or is communicatively coupled with the interface gateway device 112 (shown in FIG. 1) via a wireless communication channel.

At 404, a determination is made as to whether a communication link is detected. For example, a determination may be made as to whether a connector 204, 206, 208 (shown in FIG. 2) of a data acquisition module 110 (shown in FIG. 1) and/or a client module 114 (shown in FIG. 1) is mated with an input/output port 300, 302, 304 (shown in FIG. 3) of the interface gateway device 112 (shown in FIG. 1). As another example, a determination may be made as to whether a data acquisition module 110 and/or a client module 114 is wirelessly transmitting data to the interface gateway device 112 via one or more communication channels. If a communication link is detected, flow of the method 400 may continue to 406. On the other hand, if no communication link is detected, flow of the method 400 may return to 402.

At 406, an identity of the device that is communicatively coupled via the communication link is determined. For example, the interface gateway device 112 (shown in FIG. 1) may determine which of the acquisition data modules 110 (shown in FIG. 1) and/or client modules 114 (shown in FIG. 1) is communicatively coupled with the interface gateway device 112. The identity of the acquisition data module 110 and/or client module 114 may be the identity of a group or type of acquisition data modules 110 and/or client modules 114, as described above.

At 408, a determination is made as to whether the communication configuration for the communicatively coupled device is available. For example, the interface gateway device 112 (shown in FIG. 1) may determine if a communication configuration file associated with the identified data acquisition module 110 (shown in FIG. 1) and/or client module 114 (shown in FIG. 1) is stored on the memory 202 (shown in FIG. 2) disposed on-board the vehicle 102 (shown in FIG. 1). If the communication configuration for the identified device is not available, then the communication configuration may need to be acquired in order to configure the communications with the identified device. As a result, flow of the method 400 may continue to 410. On the other hand, if the communication configuration for the identified device is available, then flow of the method 400 may proceed to 412.

At 410, the communication configuration for the identified device is obtained. For example, the interface gateway device 112 (shown in FIG. 1) may wirelessly download the communication configuration from a computer device disposed off-board the vehicle 102 (shown in FIG. 1) via the antenna 212 (shown in FIG. 2). Alternatively, the interface gateway device 112 may download the communication configuration from a computer device disposed on-board the vehicle 102.

At 412, the communication configuration for the identified device is implemented. For example, the settings, protocols, formats, and the like, that are used to communicate data messages with the identified device are used by the interface gateway device 112 (shown in FIG. 1) to communicate with the identified device. The interface gateway device 112 may use different communication configurations for different data acquisition modules 110 (shown in FIG. 1) and/or client modules 114 (shown in FIG. 1).

In one embodiment, a plurality of different communication configurations is stored in a common location, such as on the memory 202 (shown in FIG. 2). The interface gateway device 112 (shown in FIG. 1) may select and implement (e.g., put into use for communication) the communication configuration applicable to the identified data acquisition module 110 (shown in FIG. 1) or client module 114 (shown in FIG. 1).

In another embodiment, a data communication system for a vehicle includes an interface gateway device that is configured to be communicatively coupled with a data acquisition module and a client module. The interface gateway device is further configured to receive a value of a data parameter related to operation of the vehicle from the data acquisition module and to communicate the value to the client module for performing a function for the vehicle. The interface gateway device also is configured to determine when either of the data acquisition module or the client module is communicatively coupled with the interface gateway device and to implement respective communication configurations associated with the data acquisition module or the client module to receive the value of the data parameter from the data acquisition module or communicate the value of the data parameter to the client module.

In another aspect, the interface gateway device is configured to communicate the value of the data parameter to the client module for the client module to use the value of the data parameter to control at least one of tractive effort or braking effort provided by the vehicle.

In another aspect, the interface gateway device is configured to determine when either of the data acquisition module or the client module is physically mated with one or more input/output ports of the interface gateway device.

In another aspect, the interface gateway device is configured to determine when either of the data acquisition module or the client module is communicatively coupled with the interface gateway device by a wireless communication link.

In another aspect, the interface gateway device is configured to determine an identity of either of the data acquisition module or the client module that is communicatively coupled with the interface gateway device.

In another aspect, the interface gateway device is configured to select at least one of a plurality of communication configurations from a computer readable storage medium for use in communicating with the data acquisition module or the client module based on the identity.

In another aspect, the communication configurations specify different communication protocols used to communicate with different data acquisition modules or different client modules.

In another embodiment, a data communication system for a vehicle is provided. The system includes an interface gateway device that is configured to be communicatively coupled with a data acquisition module and with a client module. The interface gateway device is further configured to receive a value of a data parameter related to operation of the vehicle from the data acquisition module and to communicate the value to the client module for performing a function for the vehicle. The interface gateway device also is configured, upon system initialization of the interface gateway device, to cycle through a plurality of communication protocols available to the interface gateway device, at each of a plurality of communication links of the interface gateway device, until the interface gateway device has determined that the data acquisition module and the client module are communicatively coupled with the interface gateway device and has identified first and second communication protocols of the plurality of communication protocols that enable the interface gateway device to communicate with the data acquisition module and the client module, respectively.

In another embodiment, a method for communicating data in a vehicle is provided. The method includes monitoring one or more input/output ports for a communication link with a device, determining an identity of the device that is communicatively coupled with the one or more input/output ports by the communication link, selecting a communication configuration associated with the device based on the identity of the device, and using the communication configuration to communicate with the device.

In another aspect, the device includes one or more of a data acquisition module or a client module, and the method further comprises one or more of the data acquisition module acquiring values of data parameters related to operations of the vehicle or the client module performing one or more functions for the vehicle based on the values of the data parameters.

In another aspect, the method further comprises the client module controlling at least one of tractive effort or braking effort of the vehicle based on the values of the data parameters.

In another aspect, the monitoring step includes determining when the device is physically mated with the one or more input/output ports.

In another aspect, the monitoring step includes determining when the device is communicatively coupled with the one or more input/output ports by a wireless communication link.

In another aspect, the selecting step includes selecting the communication configuration from a plurality of communication configurations stored on a computer readable storage medium based on the identity of the device.

In another aspect, the communication configurations specify different communication protocols used to communicate with different devices.

In another embodiment, a computer readable storage medium for a vehicle having a processor is provided. The computer readable storage medium includes one or more sets of instructions that direct the processor to monitor one or more input/output ports for a communication link with a device, determine an identity of the device that is communicatively coupled with the one or more input/output ports by the communication link, select a communication configuration associated with the device based on the identity of the device, and communicate with the device according to the communication configuration.

In another aspect, the computer readable storage medium is a tangible and non-transitory computer readable storage medium. For example, the computer readable storage medium may not be a transient electric or electromagnetic signal.

In another aspect, the one or more sets of instructions direct the processor to at least one of receive values of data parameters related to operations of the vehicle from a data acquisition module or communicate one or more of the values to a client module so that the client module performs one or more functions for the vehicle based on the values of the data parameters.

In another aspect, the one or more sets of instructions direct the processor to communicate values of data parameters related to operations of the vehicle to the client module so that the client module controls at least one of tractive effort or braking effort of the vehicle based on the values of the data parameters.

In another aspect, the one or more sets of instructions direct the processor to determine when the device is physically mated with the one or more input/output ports.

In another aspect, the one or more sets of instructions direct the processor to determine when the device is communicatively coupled with the processor by a wireless communication link.

In another aspect, the one or more sets of instructions direct the processor to select the communication configuration from a plurality of communication configurations stored on the computer readable storage medium based on the identity of the device.

In another aspect, the communication configurations specify different communication protocols used to communicate with different devices.

In another embodiment, a data communication system for a vehicle is provided. The system includes a data acquisition module, a client module, and an interface gateway module. The data acquisition module is configured to obtain a value of a data parameter related to operation of the vehicle. The client module is configured to use the value of the data parameter to perform a function for the vehicle. The interface gateway device is configured to be communicatively coupled with at least one of the data acquisition module or the client module by one or more communication links. The interface gateway device is further configured to communicate the value from the data acquisition module to the client module. The interface gateway device also is configured to determine when the at least one of the data acquisition module or the client module is communicatively coupled with the interface gateway device and to implement a communication configuration associated with the at least one of the data acquisition module or the client module to communicate the value of the data parameter to the at least one of the data acquisition module or the client module.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter described herein without departing from its scope. While the dimensions and types of materials described herein are intended to define the parameters of the disclosed subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the inventive subject matter, including the best mode, and also to enable a person of ordinary skill in the art to practice the embodiments of inventive subject matter, including making and using any devices or systems and performing any incorporated methods. The patentable scope of the inventive subject matter is defined by the claims, and may include other examples that occur to a person of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A data communication system for a vehicle within a vehicle consist including the vehicle and at least one other vehicle that are mechanically linked to travel together along a route, the system comprising:

an interface gateway device configured to be communicatively coupled with a data acquisition module and a client module, wherein the interface gateway device is further configured to receive a value of a data parameter related to operation of the vehicle from the data acquisition module and to communicate the value to the client module for performing a function for the vehicle;

wherein the interface gateway device is configured to determine when either of the data acquisition module or the client module is communicatively coupled with the interface gateway device and to implement respective communication configurations associated with the data acquisition module or the client module to receive the value of the data parameter from the data acquisition module or communicate the value of the data parameter to the client module, and wherein the interface gateway device is configured to be disposed onboard the vehicle consist.

2. The system of claim 1, wherein the interface gateway device is configured to communicate the value of the data parameter to the client module for the client module to use the value of the data parameter to control at least one of tractive effort or braking effort provided by the vehicle.

3. The system of claim 1, wherein the interface gateway device is configured to determine when either of the data acquisition module or the client module is physically mated with one or more input/output ports of the interface gateway device.

4. The system of claim 1, wherein the interface gateway device is configured to determine when either of the data acquisition module or the client module is communicatively coupled with the interface gateway device by a wireless communication link.

5. The system of claim 1, wherein the interface gateway device is configured to determine an identity of either of the data acquisition module or the client module that is communicatively coupled with the interface gateway device.

6. The system of claim 5, wherein the interface gateway device is configured to select at least one of a plurality of communication configurations from a computer readable storage medium for use in communicating with the data acquisition module or the client module based on the identity.

7. The system of claim 6, wherein the communication configurations specify different communication protocols used to communicate with different data acquisition modules or different client modules.

8. A data communication system for a vehicle within a vehicle consist including the vehicle and at least one other vehicle that are mechanically linked to travel together along a route, the system comprising:
an interface gateway device configured to be communicatively coupled with a data acquisition module and with a client module, wherein the interface gateway device is further configured to receive a value of a data parameter related to operation of the vehicle from the data acquisition module and to communicate the value to the client module for performing a function for the vehicle;
wherein the interface gateway device is configured, upon system initialization of the interface gateway device, to cycle through a plurality of communication protocols available to the interface gateway device, at each of a plurality of communication links of the interface gateway device, until the interface gateway device has determined that the data acquisition module and the client module are communicatively coupled with the interface gateway device and has identified first and second communication protocols of the plurality of communication protocols that enable the interface gateway device to communicate with the data acquisition module and the client module, respectively, wherein the interface gateway device is configured to be disposed onboard the vehicle consist.

9. A method for communicating data in a vehicle within a vehicle consist including the vehicle and at least one other vehicle that are mechanically linked to travel together along a route, the method comprising:

monitoring one or more input/output ports for a communication link with a device, the device including one or more of a data acquisition module or a client module, wherein the data acquisition module and the client module are disposed onboard the vehicle consist;
determining an identity of the device that is communicatively coupled with the one or more input/output ports by the communication link;
selecting a communication configuration associated with the device based on the identity of the device;
using the communication configuration to communicate with the device; and
one or more of the data acquisition module acquiring values of data parameters related to operations of the vehicle or the client module performing one or more functions for the vehicle based on the values of the data parameters.

10. The method of claim 9, wherein the method further comprises the client module controlling at least one of tractive effort or braking effort of the vehicle based on the values of the data parameters.

11. The method of claim 9, wherein the monitoring step includes determining when the device is physically mated with the one or more input/output ports.

12. The method of claim 9, wherein the monitoring step includes determining when the device is communicatively coupled with the one or more input/output ports by a wireless communication link.

13. The method of claim 9, wherein the selecting step includes selecting the communication configuration from a plurality of communication configurations stored on a computer readable storage medium based on the identity of the device.

14. The method of claim 13, wherein the communication configurations specify different communication protocols used to communicate with different devices.

15. A computer readable storage medium for a vehicle having one or more processors, wherein a vehicle consist includes the vehicle and at least one other vehicle that are mechanically linked to travel together along a route, the computer readable storage medium including one or more sets of instructions that direct the one or more processors to:
monitor one or more input/output ports for a communication link with a device, the device including at least one of a data acquisition module or a client module, wherein the data acquisition module and the client module are disposed onboard the vehicle consist;
determine an identity of the device that is communicatively coupled with the one or more input/output ports by the communication link;
select a communication configuration associated with the device based on the identity of the device; and
communicate with the device according to the communication configuration by at least one of receiving values of data parameters related to operations of the vehicle from the data acquisition module or communicating one or more of the values to the client module so that the client module performs one or more functions for the vehicle based on the values of the data parameters.

16. The computer readable storage medium of claim 15, wherein the one or more sets of instructions direct the one or more processors to communicate values of data parameters related to operations of the vehicle to the client module so that the client module controls at least one of tractive effort or braking effort of the vehicle based on the values of the data parameters.

17. The computer readable storage medium of claim 15, wherein the one or more sets of instructions direct the one or more processors to determine when the device is physically mated with the one or more input/output ports.

18. The computer readable storage medium of claim 15, wherein the one or more sets of instructions direct the one or more processors to determine when the device is communicatively coupled with the processor by a wireless communication link.

19. The computer readable storage medium of claim 15, wherein the one or more sets of instructions direct the one or more processors to select the communication configuration from a plurality of communication configurations stored on the computer readable storage medium based on the identity of the device.

20. The computer readable storage medium of claim 19, wherein the communication configurations specify different communication protocols used to communicate with different devices.

21. A data communication system for a vehicle within a vehicle consist including the vehicle and at least one other vehicle that are mechanically linked to travel together along a route, the system comprising:

a data acquisition module configured to obtain a value of a data parameter related to operation of the vehicle;

a client module configured to use the value of the data parameter to perform a function for the vehicle; and an interface gateway device configured to be communicatively coupled with at least one of the data acquisition module or the client module by one or more communication links, the interface gateway device further configured to communicate the value from the data acquisition module to the client module;

wherein the interface gateway device is configured to determine when the at least one of the data acquisition module or the client module is communicatively coupled with the interface gateway device and to implement a communication configuration associated with the at least one of the data acquisition module or the client module to communicate the value of the data parameter to the at least one of the data acquisition module or the client module, wherein the data acquisition module, the client module, and the interface gateway device are configured to be disposed onboard the vehicle consist.

\* \* \* \* \*

UNITED STATES PATENT AND TRADEMARK OFFICE
CERTIFICATE OF CORRECTION

| | | |
|---|---|---|
| PATENT NO. | : 8,620,552 B2 | Page 1 of 1 |
| APPLICATION NO. | : 13/311306 | |
| DATED | : December 31, 2013 | |
| INVENTOR(S) | : DeSanzo et al. | |

It is certified that error appears in the above-identified patent and that said Letters Patent is hereby corrected as shown below:

On the Title Page, item (75), under "Inventors", in Column 1, Lines 5-6,
delete "Sethu David Madhavn," and insert -- Sethu David Madhavan, --, therefor.

In the Specification

In Column 13, Line 5, delete "update module 216" and insert -- update module 220 --, therefor.

Signed and Sealed this
Twenty-seventh Day of May, 2014

Michelle K. Lee
*Deputy Director of the United States Patent and Trademark Office*